United States Patent
Elkin et al.

(10) Patent No.: US 8,726,761 B2
(45) Date of Patent: May 20, 2014

(54) SELECTIVELY FILLED COMPOSITE STEERING WHEEL

(75) Inventors: Brent T. Elkin, Imlay City, MI (US); Larry M. Wilmot, Oxford, MI (US); Valerie D. Gardner, St. Clair, MI (US)

(73) Assignee: TK Holdings Inc., Auburn Hills, MI (US)

( * ) Notice: Subject to any disclaimer, the term of this patent is extended or adjusted under 35 U.S.C. 154(b) by 976 days.

(21) Appl. No.: 12/292,088

(22) Filed: Nov. 12, 2008

(65) Prior Publication Data

US 2010/0116085 A1    May 13, 2010

(51) Int. Cl.
*B62D 1/04*    (2006.01)
*B62D 1/06*    (2006.01)

(52) U.S. Cl.
USPC .............................................. 74/552; 74/558

(58) Field of Classification Search
USPC ................... 74/552, 558; 29/894.1; 249/104; 267/141
IPC ................................................ B62D 1/06,1/04
See application file for complete search history.

(56) References Cited

U.S. PATENT DOCUMENTS

| | | | | | |
|---|---|---|---|---|---|
| 2,215,677 | A | * | 9/1940 | Walker | 74/552 |
| 4,353,266 | A | * | 10/1982 | Grothe | 74/552 |
| 4,598,002 | A | * | 7/1986 | Kimura | 428/35.8 |
| 4,633,734 | A | * | 1/1987 | Yano et al. | 74/552 |
| 4,640,150 | A | * | 2/1987 | Kobayashi et al. | 74/552 |
| 5,305,655 | A | * | 4/1994 | Kaga | 74/552 |
| 6,889,436 | B2 | * | 5/2005 | Derrick | 29/894.1 |
| 7,685,905 | B2 | * | 3/2010 | Miltenberger et al. | 74/552 |
| 2001/0025546 | A1 | * | 10/2001 | Sugiyama et al. | 74/552 |
| 2005/0155449 | A1 | * | 7/2005 | Birchmeier et al. | 74/552 |
| 2007/0137415 | A1 | * | 6/2007 | Thomas | 74/552 |

FOREIGN PATENT DOCUMENTS

| | | | | | |
|---|---|---|---|---|---|
| JP | 01178078 | A | * | 7/1989 | B62D 1/06 |
| JP | 2000264223 | A | * | 9/2000 | B62D 1/06 |
| JP | 2002225725 | A | * | 8/2002 | B62D 1/06 |

* cited by examiner

*Primary Examiner* — Thomas Diaz
(74) *Attorney, Agent, or Firm* — Foley & Lardner LLP

(57) ABSTRACT

A steering wheel for a vehicle includes a hollow shell with a first interior chamber. The steering wheel further includes an outer skin on an exterior of the hollow shell. An interior filler may be positioned in at least the first interior chamber. The hollow shell may be molded.

24 Claims, 4 Drawing Sheets

US 8,726,761 B2

SELECTIVELY FILLED COMPOSITE STEERING WHEEL

BACKGROUND

The present disclosure relates generally to the field of steering wheels for vehicles. More specifically, the present disclosure relates to a steering wheel that is formed from several components including a composite material.

Steering wheels are conventionally made by molding a skin or coating material such as polyurethane around an armature (e.g., base, framework, etc). The armature provides strength and shape to the steering wheel and is generally made from a metal such as steel, magnesium, or aluminum. The urethane provides an aesthetically and ergonomically pleasing outer surface. The steering wheel may have further components coupled to it such as appliqués formed from materials (such as leather or wood), separate back covers, switches, bezels, etc.

A new technology has immerged that includes molding the armature in multiple pieces out of a composite material such as reinforced plastic. The composite pieces are welded together to form the armature. The composite materials have certain advantages over traditional metal armatures (e.g., reduced cost, weight, and complexity).

It would be advantageous to provide an improved steering wheel including a composite armature that reduces the hollow feeling and/or rattling caused by hollow chambers formed by the composite armature.

It would be advantageous to provide an improved steering wheel including a composite armature that provides improved mounting surfaces for additional components such as switches, appliqués, or bezels.

SUMMARY

One exemplary embodiment relates to a steering wheel. The steering wheel includes a hollow shell with a first interior chamber, an outer skin on an exterior of the hollow shell, and an interior filler positioned in the first interior chamber.

Another exemplary embodiment provides a method of making a steering wheel. The method comprises molding a hollow shell, injecting a filler material into at least one interior chamber in the hollow shell, and coating an exterior surface of the hollow shell with an outer skin.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
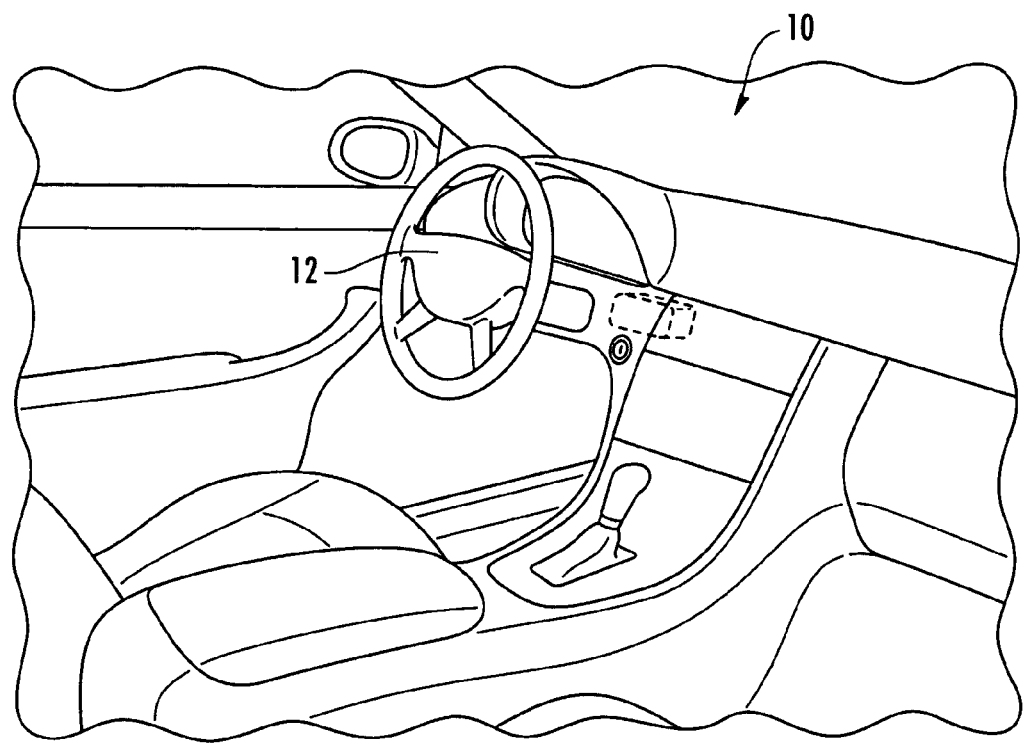
FIG. 1 is a perspective view of a vehicle interior including a steering wheel according to an exemplary embodiment.
Figure 2:
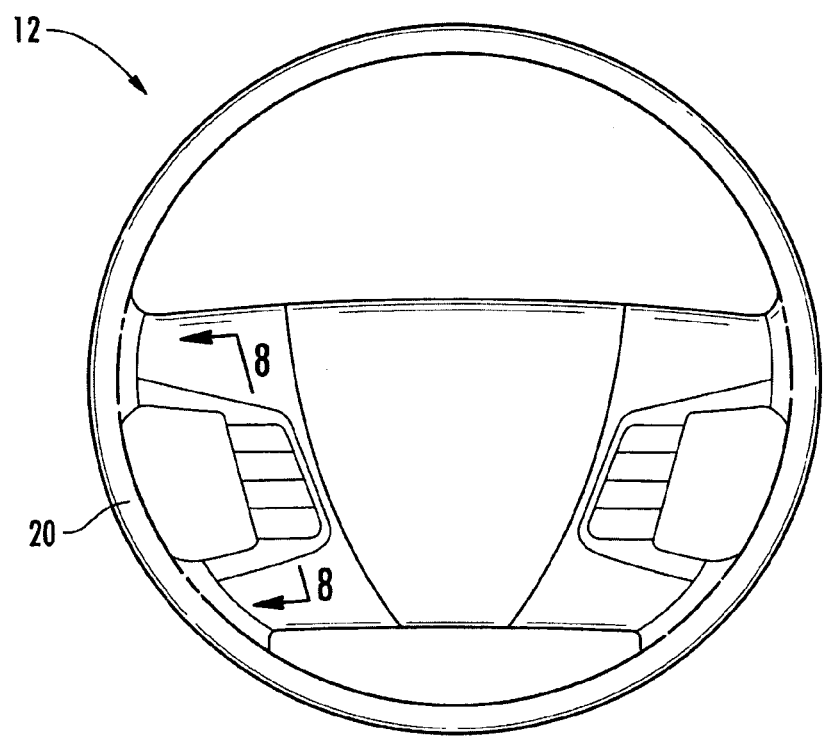
FIG. 2 is a front view of a steering wheel including a composite armature according to an exemplary embodiment.
Figure 4:
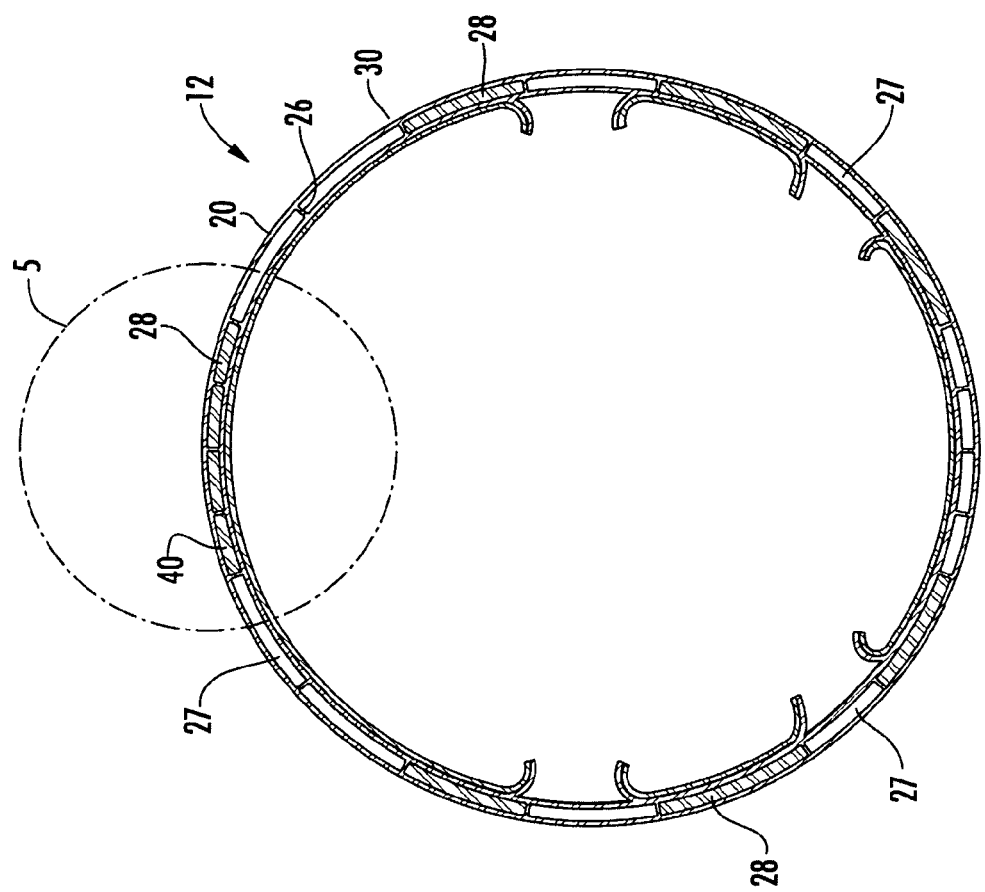
FIG. 4 is a cross-section of the steering wheel of FIG. 3 taken along line 4-4 showing a multitude of filled chambers according to an exemplary embodiment.
Figure 3:
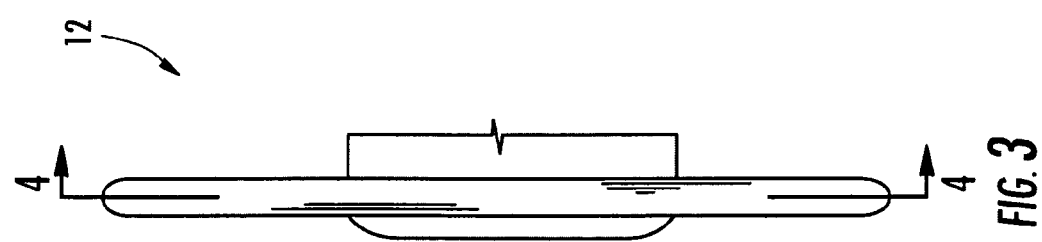
FIG. 3 is a side view of the steering wheel of FIG. 2 according to an exemplary embodiment.

Referring to FIG. 1, a vehicle driver may operate a vehicle from a cockpit (vehicle interior) 10 with a steering wheel 12. The driver may rotate the steering wheel 12 to turn the vehicle wheels and steer the vehicle in a desired direction. The steering wheel 12 may also include various controls in the form of switches or buttons provided within easy reach of the driver, such as controls for a vehicle audio system (e.g., volume, tuning, mode, etc.), controls for vehicle lighting (e.g., overhead lighting, headlights, etc.), phone controls, or other controls such as cruise controls.

Referring now to FIGS. 2-8, a steering wheel 12 is shown according to an exemplary embodiment. The steering wheel 12 includes an armature 20 (e.g., frame, shell, etc.) formed from a composite material such as a reinforced polymer (e.g., a fiber-reinforced polymer, a particle reinforced polymer, etc.). The composite armature 20 may include a first or outer half 22 and a second or inner half 24 that are coupled together (i.e., with a welding or other joining operation) to form the armature 20 (see FIGS. 6-7). The armature 20 is a generally hollow member. The first half 22 and/or the second half 24 may include interior walls 26 (e.g., intermediate walls, webs, dividers, etc.) that divide the hollow interior of the armature 20 into a multitude of chambers 28. The walls 26 may be further configured to add strength and rigidity to the armature 20.

Figure 9:
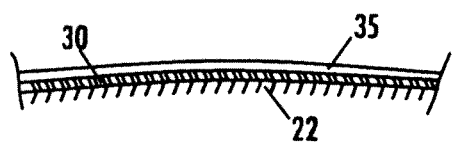
FIG. 9 is a partial cross-section of the steering wheel of FIG. 6 with a covering.

After the armature 20 is assembled, it may be covered with a skin 30 that at least partially covers the armature. The skin 30 is configured to provide an aesthetically pleasing exterior for the steering wheel 12. The skin 30 is also configured to add an ergonomically pleasing layer to the outside of the steering wheel 12 to improve the comfort of the driver. According to an exemplary embodiment, the armature 20 is placed in an injection molding tool and a material is injected into the tool to coat the outside of the armature 20 with a skin 30 formed from a second material. According to an exemplary embodiment, the skin 30 is formed from an injection molded polyurethane material. According to other exemplary embodiments, the skin 30 may be formed from a wide variety of other materials such as olefinic thermoplastic elastomers (TEOs), thermoplastic olefins (TPOs), rubber, or any other suitable material. According to one embodiment, a covering 35 may be positioned over an exterior of the outer skin 30, as seen in FIG. 9. The covering 35 may comprise leather and/or wood.

By forming the armature 20 from a composite material, the weight and cost of the steering wheel 12 may be reduced compared to one using a traditional metal armature while still retaining the strength of the metal armature.

However, hollow armatures may cause the steering wheel 12 to have a hollow sound that may be undesirable to the consumer. The hollow armature may also trap loose pieces or debris during or after assembly that may rattle as the steering wheel 12 is being turned. The hollow armature 20 also gives the steering wheel 12 a lower mass moment of inertia than a similar steering wheel formed with a traditional steering wheel formed with a metal armature. The difference in mass moment of inertia may cause an unfamiliar and undesirable "feel" for the consumer (driver). In addition, a steering wheel 12 with a lower mass moment of inertia has reduced dampening characteristics and transmits more vibrations from the vehicle wheels to the hands of the driver. It would be desirable to concentrate the majority of the mass of the steering wheel 12 at the outer periphery of the steering wheel 12 (e.g., the rim).

Figure 8:
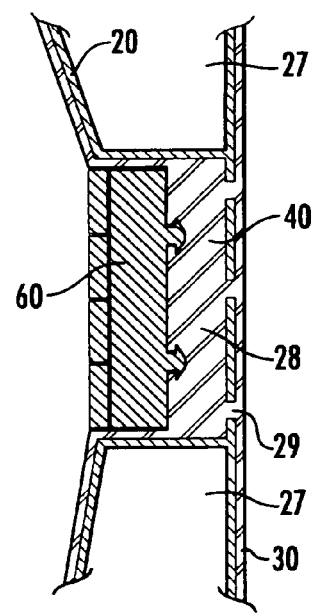
FIG. 8 is a cross-section of the steering wheel of FIG. 2 taken along line 8-8 showing a filled chamber supporting components for a steering wheel according to an exemplary embodiment.

According to an exemplary embodiment, one or more of the internal chambers (e.g., compartments, cavities, hollows, etc.) of the armature 20 may be filled with a filler material 40. As shown best in FIG. 4, the steering wheel is selectively filled with filler material 40 and includes both hollow chambers 27 and filled chambers 28. According to an exemplary embodiment, the filler material 40 comprises the same material used to form the skin 30 (e.g. polyurethane) and is injected into the chambers 28 with the same injection molding process used to form the skin 30. For simplicity, FIG. 4 omits certain sections of the armature and steering wheel that are positioned inward from the rim, such as shown in FIGS. 1 and 8, for example. As shown best in FIG. 6, openings 29 in the first half 22 and second half 24 of the armature 20 allow the filler material 40 to enter the chamber 28. Multiple openings 29 may be provided for each chamber 28 to be filled such that one or more of the openings 29 may provide a passage for filler material 40 to enter the chamber 28 and one or more openings 29 may provide vent openings to allow air to escape the chamber 28 as it is displaced with the filler material 40. While openings 29 are shown being provided on the outer radius and inner radius of the armature 20, according to other exemplary embodiments, openings 29 may be provided anywhere on the armature 20 such as the front of the armature 20 or the rear of the armature 20.

Openings 29 may further provide attachment features for the skin 30. Openings 29 allow a portions of the material forming the skin 30 to flow into the interior of the armature 20 and couple the skin 30 to the armature 20.

While the filler material 40 is shown as being formed from the same material as the skin 30 in FIGS. 2-8, according to an exemplary embodiment, the skin 30 and the filler material 40 may be different materials. For example, the filler material 40 may be formed from preformed or shaped polystyrene, olefinic thermoplastic elastomers (TEOs), thermoplastic olefins (TPOs), rubber or any other suitable material. According to other exemplary embodiments, the filler material 40 may be inserted or deposited into filled chambers 28 in a first manufacturing process while the skin 30 is applied to the outside of the armature 20 in a second manufacturing process.

Figure 5:
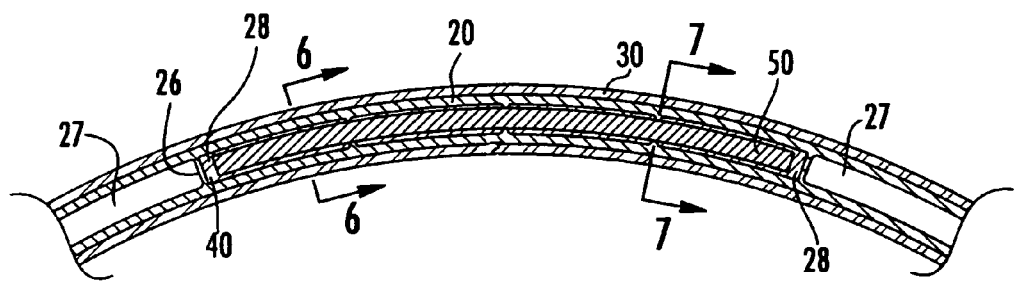
FIG. 5 is a detail cross-section of the steering wheel of FIG. 4 taken along section 5 showing a filled chamber according to an exemplary embodiment.
Figure 6:
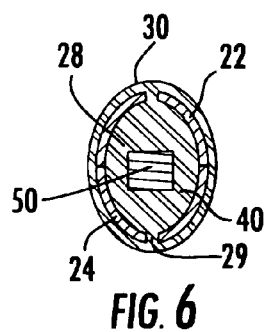
FIG. 6 is a cross-section of the steering wheel of FIG. 5 taken along line 6-6 showing a weight supported by a urethane filling according to an exemplary embodiment.
Figure 7:
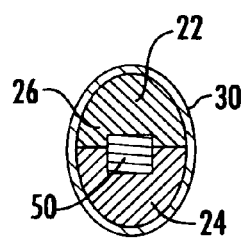
FIG. 7 is a cross-section of the steering wheel of FIG. 5 taken along line 7-7 showing a weight supported by a composite armature according to an exemplary embodiment.

Referring to FIGS. 5-7, one or more additional members such as rim weights 50 may be provided within the armature 20 to increase the mass of the steering wheel 12. According to an exemplary embodiment, the weights 50 are elongated members formed from a relatively high density material such as metal. The weights 50 are formed with a curvature that is generally equal to the curvature of the armature 20 and are trapped between the first half 22 and the second half 24. As shown in FIG. 5, weight 50 may extend through multiple filled chambers 28. Portions of weights 50 may be held in place by filler material 40 (see FIG. 6), or by the interior walls 26 of the first half 22 and/or the second half 24 of the armature 20 (see FIG. 7). While the weight 50 is shown as having a generally square cross-section in FIGS. 5-7, according to other exemplary embodiments, the weight 50 may have a wide variety of cross-sectional shapes such as circular, elliptical, etc. The weight 50 may have a constant cross-section or may have a variable cross-section along its length.

The filler material 40 and weights 50 selectively provide additional mass to the rim of the steering wheel 12. The additional mass increases the mass moment of inertia of the steering wheel 12 so it may be closer to the mass moment of inertia of a steering wheel 12 formed with a traditional metal armature. The increased mass moment of inertia creates a more familiar feel for the driver and reduces the vibration transmitted to the driver's hands from the vehicle wheels.

The filler material 40 further provides an anti-rattle feature for the filled chambers 28 by surrounding and immobilizing any loose pieces or debris trapped in the chambers 28. According to other exemplary embodiments, a second lightweight filler material such as a polymer foam may be provided in the chambers not filled with filler material 40 to prevent debris from rattling in any of the chambers of the armature 20.

Referring now to FIG. 8, according to an exemplary embodiment, one or more sections of the armature 20 aligned with a filled chamber 28 may be left open to provide a space for additional components 60 such as switches and bezels. The filler material 40 in the filled chamber 28 provides a mounting surface for the components 60. According to an exemplary embodiment, the additional components are coupled to the filler material 40 with a snap-fit.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

The present disclosure has been described with reference to exemplary embodiments, however workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

The construction and arrangement of the elements of the steering wheel as shown in the preferred and other exemplary embodiments is illustrative only. Although only a few embodiments of the present steering wheel have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in this disclosure. Accordingly, all such modifications attainable by one versed in the art from the present disclosure within the scope and spirit of the present invention are to be included as further embodiments of the present invention. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present application.

What is claimed is:

1. A steering wheel, comprising:
    a hollow shell with a plurality of interior chambers divided by at least one interior wall, the hollow shell forming an armature of the steering wheel;
    an outer skin on an exterior of the hollow shell; and
    an interior filler positioned in at least one interior chamber from the plurality of interior chambers,
    wherein the at least one interior chamber has an opening that leads from outside the hollow shell to inside the at least one interior chamber,
    wherein the hollow shell forms an outer rim portion, a hub portion within the rim portion, and at least one connecting portion connecting the rim and hub portions, and
    wherein the rim portion and the at least one connecting portion of the hollow shell are formed from composite plastic.
2. The steering wheel of claim 1, wherein the outer skin covers at least substantially all of the exterior of the hollow shell.
3. The steering wheel of claim 1, wherein the interior filler comprises polyurethane.
4. The steering wheel of claim 1, wherein the plurality of interior chambers comprises another interior chamber, and wherein the second interior chamber remains unfilled by the interior filler.
5. The steering wheel of claim 1, further comprising a covering over an exterior of the outer skin.
6. The steering wheel of claim 5, wherein the covering comprises leather, wood, or a combination thereof.
7. The steering wheel of claim 1, wherein the outer skin comprises a first material and the interior tiller comprises the same first material.
8. The steering wheel of claim 1, wherein the opening retains the outer skin to the hollow shell.
9. The steering wheel of claim 1, further comprising a rim weight positioned in the at least one interior chamber.
10. The steering wheel of claim 9, wherein the interior filler surrounds the rim weight inside the at least one interior chamber.
11. The steering wheel of claim 1, wherein the interior filler comprises preformed or shaped polystyrene.
12. The steering wheel of claim 1, wherein the interior filler comprises olefinic thermoplastic elastomer, thermoplastic olefin, or rubber,
13. The steering wheel of claim 1, wherein the hollow shell comprises a reinforced polymer.
14. The steering wheel of claim 1, wherein the interior filler dampens vibrations in the steering wheel.
15. A steering wheel, comprising:
    a hollow shell with a plurality of interior chambers divided by a plurality of interior walls, the hollow shell forming an armature of the steering wheel, wherein the plurality of interior chambers comprises a first set of interior chambers and a second set of interior chambers;
    an outer skin on an exterior of the hollow shell; and
    an interior filler positioned in the first set of interior chambers such that no empty space remains in the first set of interior chambers and the second set of interior chambers remain unfilled by the interior filler,
    wherein the hollow shell forms an outer rim portion, a hub portion within the rim portion, and at least one connecting portion connecting the rim and huh portions, and
    wherein the rim portion and the at least one connecting portion of the hollow shell are formed from composite plastic.
16. The steering wheel of claim 15, wherein the outer skin covers at least substantially all of the exterior of the hollow shell.
17. The steering wheel of claim 15, further comprising a covering over an exterior of the outer skin.
18. The steering wheel of claim 15, wherein the outer skin comprises a first material and the interior filler comprises the same first material.
19. The steering wheel of claim 15, wherein the outer skin comprises a first material, and the interior filler comprises a second material different from the first material.
20. The steering wheel of claim 15, wherein at least one interior chamber from the first set of interior chambers has an opening that leads from outside the hollow shell to inside the at least one interior chamber.
21. The steering wheel of claim 15, further comprising a rim weight positioned in at least one interior chamber from the first set of interior chambers, and
    wherein the interior filler surrounds the rim weight inside the at least. one interior chamber from the first set of interior chambers.
22. The steering wheel of claim 15, wherein the interior filler comprises polyurethane, preformed polystyrene, shaped polystyrene, olefinic thermoplastic elastomer, thermoplastic olefin, or rubber.
23. The steering wheel of claim 15, wherein the hollow shell comprises a reinforced polymer.
24. The steering wheel of claim 1, wherein the interior filler is a solid material that extends between opposite wall portions of the at least one interior chamber so as to abut the opposite wall portions of the at least one interior chamber.

* * * * *